No. 743,573. PATENTED NOV. 10, 1903.
C. SCOTT-SNELL.
ANTIVIBRATOR FOR INCANDESCENT GAS OR VAPOR LIGHTING.
APPLICATION FILED JAN. 26, 1903.
NO MODEL.

Attest:
C. Middleton
N. E. Durand

Inventor:
Charles Scott-Snell
by Ellis Spear & Company
Attys

No. 743,573.                                                   Patented November 10, 1903.

UNITED STATES PATENT OFFICE.

CHARLES SCOTT-SNELL, OF LONDON, ENGLAND.

ANTIVIBRATOR FOR INCANDESCENT GAS OR VAPOR LIGHTING.

SPECIFICATION forming part of Letters Patent No. 743,573, dated November 10, 1903.

Application filed January 26, 1903. Serial No. 140,615. (No model.)

*To all whom it may concern:*

Be it known that I, CHARLES SCOTT-SNELL, a subject of the King of Great Britain and Ireland, residing at 53 Victoria street, in the city of Westminster, London, S. W., England, have invented certain new and useful Improvements in Antivibrators for Incandescent Gas or Vapor Lighting, (for which I have made application for Letters Patent in Great Britain, No. 26,705, dated December 3, 1902,) of which the following is a specification.

This invention relates to improved means for preventing the vibrations of the burner-tube of an incandescent gas or vapor burner from being transmitted to the burner-head and incandescent mantle where the mantle is carried upon a float in a mercury-cup secured to the burner-tube.

My invention consists in providing the mercury-cup with several inclined surfaces carrying balls which are so situated that when the burner-tube is submitted to violent vibration the float may come in contact with one or more of the balls and roll them up the incline, whereby the vibration of the burner-tube is prevented from passing to the mantle.

Figure 1:
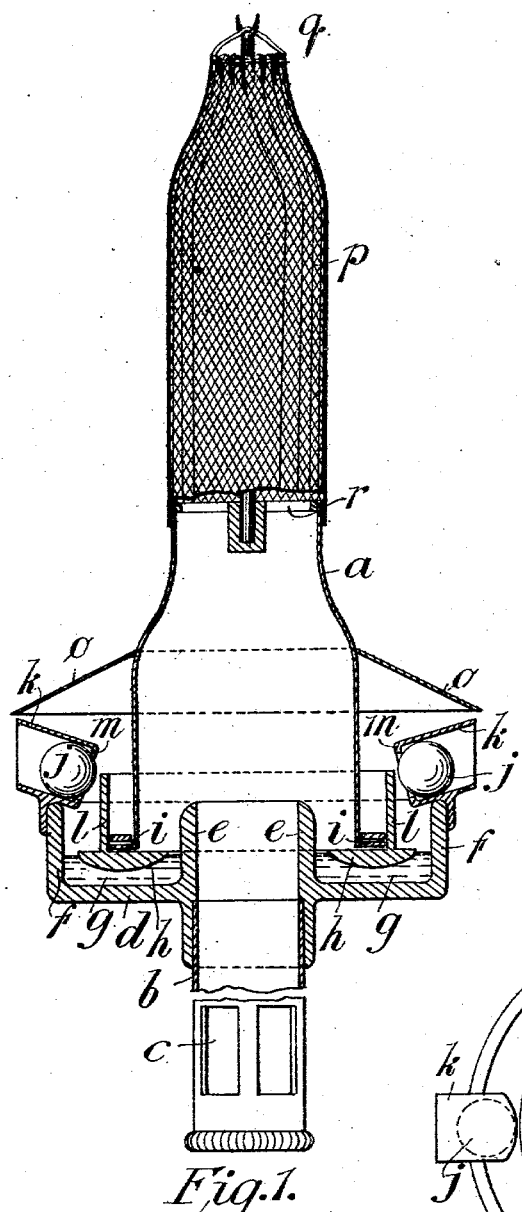
Figure 2:
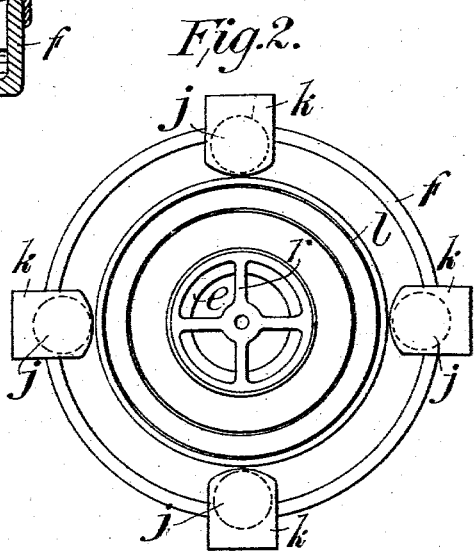

In the accompanying drawings, Figure 1 is a sectional view of a burner tube and head with the invention applied. Fig. 2 is a plan of the same with the mantle, supporting-crutch, and heat-shield removed.

In carrying out my invention the burner-head $a$ is separated from the burner-mixing tube $b$, the bottom of which is secured in any suitable manner to the gas-supply, air being admitted through the opening $c$. At the top of the tube $b$ there is secured an annular vessel $d$, provided with circular inner and outer walls $e$ and $f$ concentric with the tube $b$.

The vessel is about half-filled with mercury $g$, and there is placed upon the mercury an annular float $h$, of material that will not be affected by the mercury. The float carries a vertical and concentric wall $l$ on its upper surface. The burner-head $a$ rests upon the float $h$ and is provided with a bottom flange $i$, which fits inside the circular wall $l$. The burner-head and float are kept practically central in the mercury vessel by means of steel or other balls $j$, which are free to be moved up inclined tubes $k$ of slightly greater diameter than the balls and provided with inwardly-projecting flanges $m$ to prevent the balls from falling into the mercury vessel. The inclined tubes $k$ are arranged so that the balls very nearly touch the wall $l$ when the float and burner-head are exactly central, as seen in Fig. 2. When vibration of the tube takes place, however, and the float and burner-head are somewhat displaced radially, the wall is brought into contact with one or more of the balls, and thereby rolls them up the inclines. The resistance thus produced damps the movement of the burner-head and tends to centralize it.

The tubes $k$ may not be of the same inclination throughout, but may vary, so that the centralizing action of the balls may be accentuated in any desired position.

Ample clearness is provided between the edges of the float $h$ and the walls $e$ and $f$ to prevent them from coming in contact with each other. The mercury and float provide a seal to prevent escape of combustible mixture from the tube $b$ and head $a$.

To avoid as much as possible loss of mercury by volatilization, the mercury-trough is covered by an inclined shield $o$, secured to the burner-head.

The mantle $p$ is suspended by the usual crutch $q$, supported in the grid $r$ over the mantle-head.

Having thus described my invention, what I claim as new, and desire to secure by Letters Patent, is—

1. An antivibrator for incandescent gas or vapor burners comprising in combination, a burner-head supported upon a float in a mercury seal, the float being capable of radial movement on the mercury, a vessel containing the mercury mounted on the burner-tube, a plurality of inclines, and balls rolling on the inclines and adapted to yieldingly resist undue radial movement of the float and to centralize the burner-head, substantially as described.

2. An antivibrator for incandescent gas or vapor burners, comprising in combination, a burner-head supported upon an annular float in a mercury seal, the float being capable of radial movement on the mercury, a circular vessel containing the mercury mounted on the burner-tube, a heat-shield carried by the burner-head over the mercury, a plurality of inclines and balls rolling on them adapted to yieldingly resist undue radial movement of the float and centralize the burner-head, substantially as described.

In witness whereof I have hereunto set my hand in presence of two witnesses.

CHARLES SCOTT-SNELL.

Witnesses:
 BERTRAM H. MATTHEWS,
 WALTER E. ROCHE.